(12) United States Patent
Haverkamp

(10) Patent No.: US 10,415,955 B2
(45) Date of Patent: Sep. 17, 2019

(54) MEASURING SYSTEM

(71) Applicant: CARL ZEISS INDUSTRIELLE MESSTECHNIK GMBH, Oberkochen (DE)

(72) Inventor: Nils Haverkamp, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/839,909

(22) Filed: Dec. 13, 2017

(65) Prior Publication Data

US 2018/0172429 A1 Jun. 21, 2018

(30) Foreign Application Priority Data

Dec. 15, 2016 (DE) ........................ 10 2016 124 549

(51) Int. Cl.
*G01B 11/24* (2006.01)
*G01B 11/00* (2006.01)
*G01B 5/008* (2006.01)

(52) U.S. Cl.
CPC ............ *G01B 11/007* (2013.01); *G01B 5/008* (2013.01); *G01B 11/005* (2013.01); *G01B 11/24* (2013.01)

(58) Field of Classification Search
CPC .... G01B 11/30; G01B 11/007; G01B 21/042; G01B 5/008; G01B 11/002; G01B 11/005; G01B 11/24; G01B 11/245; G01B 2210/50; G01B 5/012; G01N 15/14; G01N 2015/1006; G01N 2035/00099; G01N 2035/00306; G01N 2035/00326; G01N 2035/00811; G01N 2035/00891; G01N 2035/009; G01N 33/48792;
(Continued)

(56) References Cited

U.S. PATENT DOCUMENTS 7,414,732 B2 8/2008 Maidhof et al.
8,502,991 B2 8/2013 Daxauer et al.
(Continued)

FOREIGN PATENT DOCUMENTS

DE 103 45 743 A1 5/2005
DE 10 2008 043 360 A1 5/2010
(Continued)

*Primary Examiner* — Michael P Stafira
(74) *Attorney, Agent, or Firm* — Harness, Dickey & Pierce, P.L.C.

(57) ABSTRACT

A measuring system for dimensionally measuring an object, comprising an object carrier, a plurality of optical markers, which are arranged at the object carrier and/or the object, and a first sensor for a tactile, optical and/or tomographic scanning of the object. The first sensor generates a first measuring signal. A second optical sensor captures a spatial orientation and position of the object with the help of optical markers. The second sensor generates a second measuring signal that contains information relating to the position and spatial orientation of the optical markers. The second sensor is connected to the first sensor via a mechanically rigid connection. An evaluation unit is configured to determine, from the second measuring signal, the position and spatial orientation of the object relative to the first sensor and to determine, from the first measuring signal, a geometry of the object.

16 Claims, 2 Drawing Sheets

(58) Field of Classification Search
CPC ....... G01N 35/00029; G01N 35/00623; G01N 35/00871; G02B 27/0093; G02B 27/017; G02B 27/0172

See application file for complete search history.

(56) References Cited

U.S. PATENT DOCUMENTS

| | | |
|---|---|---|
| 2005/0131582 A1 | 6/2005 | Kazi et al. |
| 2016/0223316 A1* | 8/2016 | Jordil .................... G01B 11/005 |
| 2018/0018778 A1* | 1/2018 | Haverkamp ........... G01B 5/008 |
| 2018/0106595 A1* | 4/2018 | Christoph .............. G01B 5/012 |

FOREIGN PATENT DOCUMENTS

| | | | |
|---|---|---|---|
| DE | 10 2015 205 738 | * | 3/2015 |
| EP | 2 728 374 A1 | | 5/2014 |

* cited by examiner

MEASURING SYSTEM

CROSS-REFERENCES TO RELATED APPLICATIONS

This application claims Convention priority of German patent application 10 2016 124 549.6, filed on Dec. 15, 2016. The entire content of this priority application is incorporated herein by reference.

BACKGROUND OF THE INVENTION

The present disclosure relates to a measuring system for dimensionally measuring an object. This measuring system is preferably realized in the form of a coordinate-measuring machine.

A multiplicity of measuring systems for dimensionally measuring an object are already known from the prior art. In dimensional metrology, a wide variety of measuring methods are used to measure objects of any type in terms of their geometry and the dimensions.

A method that is used frequently in the construction of vehicle bodies is for example the measuring method using stripe light projection, in which the three-dimensional geometry of the workpiece to be measured can be calculated on the basis of customary triangulation methods. Such methods are known for example from U.S. Pat. No. 7,414,732 B2 and U.S. Pat. No. 8,502,991 B2.

As an alternative, in particular for measuring applications requiring very high precision, coordinate-measuring machines are typically used. In such coordinate measuring machines, different kinds of sensors may be used to capture the coordinates of the object to be measured. For example, measuring sensors as are sold by the applicant under the product designation "VAST XT" or "VAST XXT" are known in this regard. Here, the surface of the workpiece to be measured is scanned with a stylus, the coordinates of which in the measurement space are known at all times. Such a stylus may also be moved along the surface of a workpiece, such that a multiplicity of measurement points may be captured at set time intervals during such a measuring process within the scope of what is known as a "scanning method".

Furthermore, it is known practice to use optical sensors that facilitate contactless capturing of the coordinates of the measurement object. One example of such an optical sensor is the optical sensor sold by the applicant under the product designation "ViScan".

Furthermore, a multiplicity of coordinate measuring machines exist which use both tactile and optical sensors. This kind of coordinate measuring machine is also known as a multi-sensor coordinate measuring machine.

Coordinate measuring machines generally involve complex engineering work in order to link what is known as the tool centre point of the sensor or sensors to the material measures in the machine during dimensional measurements. The machine requires these material measures during measurement of components to establish a spatial relationship between the measurement positions at which the individual probing operations take place as part of a measurement plan. The material measures are required as orientation aid, as it were, so that the machine knows the position and spatial orientation of the sensor and the object to be measured.

The material measures in coordinate measuring machines are generally in the form of linear material measures and/or rotary angle sensors, with respect to which the machine measures the displacement that is necessary to be able to bring the sensor or sensors to different locations relative to the object to be measured.

The mechanics and the material measures are designed regularly carefully and hence expensively. The underlying reason is that the respective material measures are inevitably situated not near the tool centre point, but typically at the edge of the measurement volume and, as viewed from the tool centre point, away from the mechanics for introducing the respectively required degree of freedom of location displacement. Were this chain configured cheaply, i.e. mechanically not absolutely exactly or even to be "rickety", no reliable connection to the material measures and thus no exact measurement of the object would be possible. This problem generally affects all measurement machines having sensors with a measurement region that is smaller than the desired measurement volume or than the size of the object to be measured.

In a large number of coordinate measuring machines of a wide variety of structural types, movable object carriers are used for example, by way of which the object to be measured is displaced along one, two or three axes relative to the measuring sensor to perform the multiplicity of probing operations that are specified in the test plan. The displacement mechanics of these object carriers must then make possible extremely exact positioning of the object to be measured, wherein the respective position must be continuously traceable with a high degree of precision, because otherwise the position and spatial orientation of the object relative to the sensor to be measured is unknown. It is easily understandable that such displacement mechanics, as are also used elsewhere in coordinate measuring machines, for example for the position change of the measuring sensor, are highly complicated and thus expensive.

In contrast, however, there is a continued effort to be able to save costs in terms of production of such coordinate measuring machines. However, this must not be at the expense of the measurement accuracy.

SUMMARY OF THE INVENTION

It is thus an object to provide a measuring system for dimensionally measuring an object, which is cheaper in production and yet can be used to realize great measurement accuracy. In this context, it is in particular an object to be able to dispense with expensive material measures, mechanics and drives.

In accordance with an aspect of the present disclosure, a measuring system of the type set forth above is presented, which comprises the following components or features:
  an object carrier for receiving the object to be measured;
  a plurality of optical markers, which are arranged at the object carrier and/or the object to be measured;
  a first sensor for a tactile, optical and/or tomographic scanning of the object to be measured, wherein the first sensor generates a first measuring signal;
  a second, optical sensor for capturing a spatial orientation and position of the object to be measured with the help of the optical markers, wherein the second sensor generates a second measuring signal that contains information relating to position and spatial orientation of the optical markers, and wherein the second sensor is connected to the first sensor via a mechanically rigid connection; and
  an evaluation unit that is configured to determine, from the second measuring signal, the position and spatial orientation of the object to be measured relative to the first sensor and to determine, from the first measuring signal, a geometry of the object to be measured.

The present disclosure is based on the idea of adding to the customary measuring sensor of the measuring system (referred to here as the "first sensor") a second, optical sensor, which continuously measures the pose, i.e. the position and spatial orientation, of the object to be measured relative to the first sensor with the aid of optical markers which are arranged at the object carrier and/or the object to be measured. Optical markers that are used are preferably identifiable reference objects within the object space.

With this approach, the mechanical engineering outlay is drastically reduced, because the expensive material measures at or within the displacement kinematics of the measuring system can be dispensed with. The displacement kinematics with which the measuring sensor (first sensor) and the measurement object are displaced relative to each other no longer need to be able to be positioned with exact traceability, because the determination of the position and spatial orientation in accordance with the present disclosure is no longer integrated in the displacement kinematics, but is performed by the second sensor.

The second sensor is preferably a camera, for example a stereoscopic camera, with which image recordings of the object carrier and/or the object to be measured are produced. Contained in these image recordings are images of the optical markers, which are used by the evaluation unit to determine the pose of the object to be measured, for example using known triangulation methods.

The first sensor acts as a measuring sensor, while the second sensor serves as a kind of navigation system for determining the position and spatial orientation of the object to be measured relative to the first sensor.

The two sensors are connected to one another via a mechanically rigid connection. A "mechanically rigid connection" is understood to mean in particular a connection via a rigid body, preferably without intermediate joints or other mechanical bearings. This connection should be invariant to operation and operation parameters, preferably invariant to time and temperature, in order to avoid shifts between the two sensors that could result in measurement errors, because the relative position between the two sensors is assumed to be fixed and is not measured separately.

The second sensor for measuring the pose of the object to be measured, in contrast to a "regular" standard sensor as is used typically at the individual axes of a coordinate-measuring machine for position determination, does not serve only for position determination of the measuring sensor relative to the object carrier along an axis, but for the overall position determination of all spatial coordinates and the determination of the spatial orientation of the object to be measured relative to the first sensor. Separate position determination of individual displacement axes of the coordinate measuring machine can therefore be dispensed with. The first sensor and the second sensor merely need to be calibrated once relative to one another. As long as their relative positions can then be assumed to be fixed, unintended shifting of the object to be measured on the object carrier or inaccuracies within the displacement axes of the measuring system would no longer result in a measurement error, because the changes in the position and spatial orientation of the object relative to the first sensor can be continuously determined by way of the second sensor.

The entire mechanics including the kinematics of the measuring system can therefore be designed substantially more easily and therefore more cost-effectively, without this having a negative influence on the measurement accuracy of the system.

In accordance with a refinement, it is preferred for the evaluation unit to be configured to determine, from the second measuring signal, only the position and spatial orientation of the object to be measured relative to the first sensor, but not the geometry of the object to be measured, and for the evaluation unit to be configured to determine, from the first measuring signal, only the geometry of the object to be measured, but not the position and spatial orientation thereof relative to the first sensor.

As a result, there is a clear separation between determination of the position and spatial orientation of the object to be measured and determination of the surface geometry thereof. Every piece of information generated by the first sensor relating to the object to be measured can be mapped into the spatial coordinate system of the object to be measured by linking the object information of the first sensor to the spatial information of the second sensor. Specifically, instead of surface location assignments, volume location assignments can be effected if e.g. a tomographic sensor is used as the first sensor.

It is preferred in particular for the evaluation unit to be configured to determine, from the second measuring signal, a position and spatial orientation of a workpiece coordinate system that moves jointly with the object to be measured, and wherein the evaluation unit is configured to determine, from the first measuring signal, coordinates of individual measurement points within the workpiece coordinate system which measurement points of the object to be measured are scanned in tactile, optical and/or tomographic fashion by the first sensor to determine the geometry of the object to be measured.

In accordance with a further configuration of the present disclosure, the two sensors are arranged next to one another in a structurally shared sensor unit.

In this way, the two sensors, the first sensor and the second sensor, are affected simultaneously by all displacements of the object to be measured relative to the sensor unit.

According to a further refinement, the measuring system comprises a movement mechanism for moving the object carrier along at least one axis manually or by way of a motor.

Unlike in "conventional" coordinate measuring machines, this movement mechanism of the object carrier does not necessarily have to be displaceable into an exact position, because the determination of position and spatial orientation takes place using the second sensor, which is configured to be independent of and separate from the object carrier. A separate position sensor within the movement mechanism is not necessary. As a result, it is possible for example to use an object carrier of very simple construction that is manually displaceable. This allows a further cost reduction.

According to a further refinement, the optical markers are arranged at the object carrier, and the object carrier comprises a fastening device for fastening the object to be measured to the object carrier.

In this case, the position and spatial orientation of the object to be measured are thus determined indirectly by way of determining the position and spatial orientation of the object carrier, which is determined by way of the second sensor on the basis of the optical markers. By fastening the object to be measured to the object carrier, it can be assumed that changes in position and spatial orientation of the object to be measured are accompanied or coincide with the changes in position and spatial orientation of the object carrier.

The first sensor that is used to measure the surface geometry and/or interior contours (e.g. using tomographic methods) of the object to be measured can be configured differently depending on the measurement requirement, as already mentioned.

According to a refinement of the present disclosure, the first sensor is a tactile sensor which comprises a tactile probe head for probing the object to be measured in tactile fashion.

In this refinement, it is in particular preferred for the evaluation unit to be configured to determine the position and spatial orientation of the tactile probe head from the second measuring signal when the object to be measured is contacted by the tactile probe head. The first, in this case tactile sensor consequently here also serves for the actual probing of the object to be measured. The second, optical sensor determines the position at which probing is affected.

According to an alternative refinement, not only the second sensor, but also the first sensor is an optical sensor. However, this does not change the above-described functional separation of the two sensors into measuring sensor (first sensor) and sensor for identifying position and spatial orientation (second sensor).

Due to their functional difference, the two sensors also have a different requirement profile for their optical units. According to a refinement, the first optical sensor comprises a first lens and the second optical sensor comprises a second lens, wherein the first lens has a lower depth of field, a larger focal length and/or a lower field angle than the second lens.

This is because the geometry measurement performed by the first sensor is a detail measurement, while it is more important for the second sensor that is used to determine the position and spatial orientation to have a comparatively greater viewing angle and a greater depth of field to be able to capture the optical markers as well as possible.

In a further refinement, the optical axis of the first lens is inclined relative to the optical axis of the second lens.

The focal plane of the second sensor can still be observed sufficiently parallel with respect to the object carrier plane due to the greater depth of field of its lens. As a result, a large viewing angle is attained, which makes the individual optical markers provided on the object carrier relatively easily identifiable for the second sensor.

According to a further refinement, the first optical sensor comprises a telecentric lens and the second optical sensor comprises a non-telecentric lens, in particular an entocentric lens.

This design suppresses the influence of focus plane deviations on the dimensional measurement of the object and already allows a determination of the object displacement relative to the first sensor in the z-direction by evaluating the size of or the distance between the optical markers.

According to a further refinement of the present disclosure, the first sensor and the second sensor are integrated in one and the same camera, which has two beam paths that are separated from one another chromatically and/or temporally and/or in polarization-optical terms, wherein a first beam path of the two beam paths is used by the first sensor and a second beam path of the two beam paths is used by the second sensor.

In principle, the camera in this refinement can also have a third beam path, which is separated from the first beam path chromatically, in terms of time and/or in polarization-optical terms and is likewise used by the second sensor. In such a case, a beam path which preferably passes through a telecentric lens would then be used for the detail measurement of the object surface, while the other two beam paths that each preferably pass through non-telecentric lenses would be used for determining the position and spatial orientation of the object to be measured.

In contrast to the previously described refinements, both sensors would then be integrated in the same camera. Even if this is realized in this refinement "merely" by separating the beam paths from one another, this should also be considered in the present meaning as two different sensors having two different functions. The two sensors are also preferably separated structurally from one another in this refinement by the use of two optical units or lenses that are separate from one another.

The above-mentioned measurement principle remains the same in principle even in this refinement. Due to the combination of both sensors within the same camera, however, a higher level of integration is achieved. In addition, it is naturally possible for the required time-invariant and temperature-invariant connection between the two sensors to be realized even better in this refinement.

In the last-mentioned refinement, it is furthermore preferred for the first and the second sensor to use one and the same camera chip of the camera.

In the case of a chromatic separation of the two measuring signals, this poses no problem in any event. However, it would be possible to achieve a higher resolution if in this case all camera pixels could be used both for determining the object contour (first sensor) and for determining the object pose (second sensor), although this would require a temporal separation of the signals or beam paths. However, the use of only one camera chip has in all three cases (chromatic, temporal and/or polarization-optical separation of signals) the advantage of reduced costs.

The optical markers can be configured in a multiplicity of different variants. Depending on the requirement, passive markers would be feasible, which are static, i.e. invariable, and are incorporated in the object carrier or attached thereto. To ensure the required high measurement accuracy, said markers should be temperature-invariant and time-invariant in terms of their appearance, their position and spatial orientation.

According to a refinement of the present disclosure, the optical markers comprise a colour-dependent, time-dependent and/or polarization-dependent hologram, with respect to which the second sensor measures the displacement and/or displacement velocity and/or displacement acceleration. It is clear that the second sensor in this refinement should then be designed for example in spatially, depth-, colour-, time- and polarization-resolving manner in accordance with the dimensionality of the optical marker.

In principle, passive markers have the advantage that, in contrast to most active markers, they do not contribute to temperature changes, which can result in undesired measurement inaccuracies.

It goes without saying that the aforementioned features and those yet to be explained below can be used not only in the combination specified in each case but also in other combinations or on their own, without departing from the scope of the present disclosure.

BRIEF DESCRIPTION OF THE DRAWINGS

Illustrative embodiments of the disclosure are depicted in the drawings and explained in more detail in the following description. In the drawings.

DETAILED DESCRIPTION OF THE PREFERRED EMBODIMENTS

Figure 1:
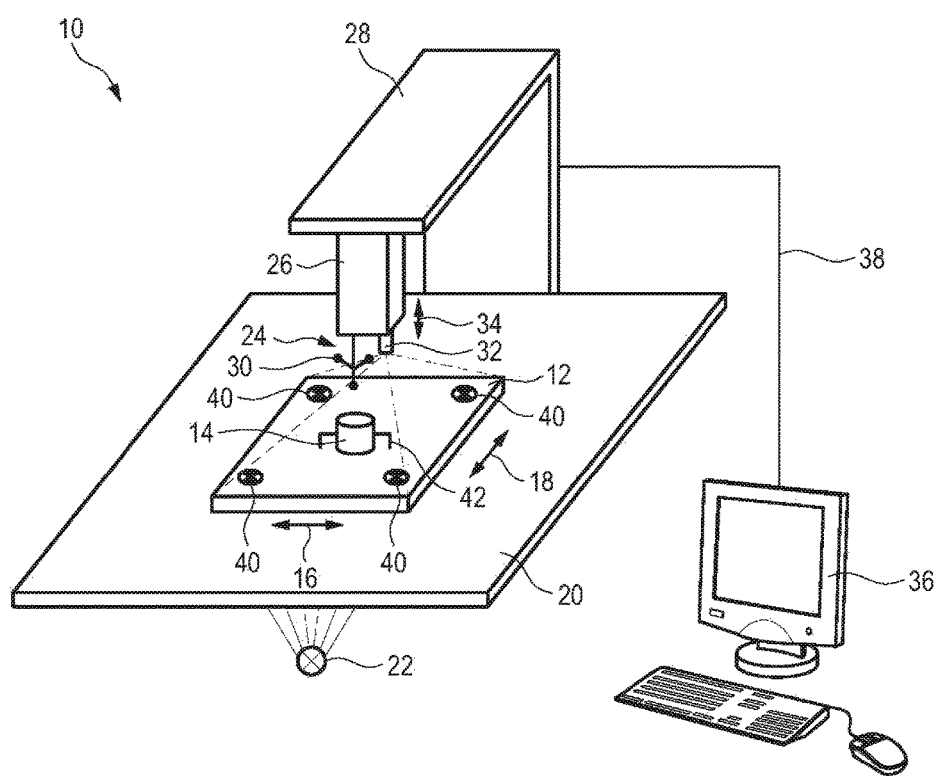
FIG. 1 shows a schematic view of a first exemplary embodiment of the measuring system.

FIG. 1 shows a first exemplary embodiment of the measuring system according to the disclosure. In this exemplary embodiment, the measuring system is configured as a coordinate-measuring machine in stand-type construction. The measuring system is indicated therein in its entirety by reference number 10.

The measuring system 10 has an object carrier 12, on which an object 14 to be measured can be placed. Said object carrier 12 is horizontally displaceable in the exemplary embodiment shown in FIG. 1 along two axes 16, 18 which are aligned such that they are orthogonal with respect to one another. The two axes 16, 18 are typically referred to as x-axis and y-axis.

The drive of the object carrier 12 is either in the form of a motor, e.g. electric motor, hydraulic or pneumatic drive or as a manual drive, for example using one or several cranks.

A base 20 serves as the carrier structure for the object carrier 12. This is preferably a stable plate, for example made of granite. Provided underneath the object carrier 12 is furthermore an illumination device 22, by means of which the object 14 to be measured can be illuminated from below. The illumination device 22 is arranged underneath the object carrier 12. It is additionally preferably integrated in the base 20. The object carrier 12 itself is therefore preferably made of a light-transmissive material, for example glass.

However, it is to be understood that rather than or in addition to what is known as transmitted light illumination, in which the object 14 to be measured is illuminated from below, i.e. in which the object 14 to be measured is arranged between the illumination device 22 and the measuring sensor, what is known as a reflected light illumination device can be provided, which illuminates the object 14 to be measured from above.

The measuring system 10 furthermore has a measuring head 24, which can be used to measure the object 14. This measuring head 24 is arranged in the present exemplary embodiment at the underside of a quill 26, which is connected to the base plate 20 of the measuring system 10 by way of a stand 28. The measuring head 24 has a first sensor 30, which in the present exemplary embodiment is configured as a tactile sensor having one or more styli. The measuring head 24 furthermore has a second sensor 32, which is configured in the form of an optical sensor.

Both sensors 30, 32 are connected to one another within the quill 24 by way of a mechanically rigid connection. The two sensors 30, 32 therefore do not move relative to one another. However, this applies substantially to the base of the two sensors 30, 32. It is to be understood that the tactile stylus of the first sensor 30 can be connected to the base thereof within the first sensor in articulated fashion in order to permit deflection of the stylus during probing of the object 14 to be measured.

The two sensors 30, 32 can be displaced by way of or within the quill 24 along a third axis 34, which is orthogonal with respect to the two other axes 16, 18. Said third axis 34 is typically referred to as the z-axis. Similar to the drives of the two remaining axes 16, 18, the z-axis can also be driven either by way of motor or manually.

The measuring system 10 furthermore has an evaluation unit 36, which is illustrated schematically here in the form of a computer. This evaluation unit 36 serves for evaluating the data obtained by the measuring head 24 and for determining the spatial coordinates of the object 14 to be measured on the basis of the evaluated measurement data. The evaluation unit 36 can either be structurally integrated in the measuring system 10, or, as illustrated in FIG. 1, be arranged separately therefrom and be connected to the remaining components, in particular to the measuring head 24 and the object carrier 12, by way of a cable-free or a cable-bound connection 38. It would be expedient to combine the evaluation unit 36 with the control unit of the measuring system 10, by way of which the functions of the measuring system, i.e. for example the measuring head 24, the object carrier 12 and the illumination device 22, are controlled.

The present disclosure provides a type of functional separation between the two sensors 30 and 32. The basic orientation, i.e. the determination of the spatial orientation of the object 14 to be measured, is effected using the second optical sensor 32. Said second optical sensor 32 uses a plurality of optical markers 40 which are arranged in the present exemplary embodiment in the corners of the object carrier 12. If the second sensor 32 is configured in the form of a stereo camera, for example, it is possible using conventional triangulation methods to uniquely determine the pose of the object carrier 12 using the optical markers 40. This determination of position and spatial orientation is effected on the basis of the second measuring signal generated by the second sensor 32 (referred to here as the "second measuring signal") within the evaluation unit 36.

In order to ensure synchronicity of the movement of the object carrier 12 and the movement of the object 14 to be measured, the object carrier 12 has in the present exemplary embodiment a fastening device 42, by way of which the object 14 to be measured can be fastened to the object carrier 12. It is thus also possible, using the determination of the position and spatial orientation of the object carrier 12 performed by the second sensor 32, to indirectly, yet very exactly determine the respective position of the object 14 to be measured.

The first sensor 30 performs the function of the detailed measurement of the object 14. It measures the surface geometry of the object 14 to be measured by way of the stylus of the first sensor 30 probing a multiplicity of measurement points on the surface of the object 14 one after another. In the process, the first sensor generates a measuring signal (referred to here as the "first measuring signal"), which is evaluated in the evaluation unit 36. During this probing, the position of the object 14 relative to the first sensor 30 is determined using the second sensor 32. The exact coordinates of the measurement object 14 in space are therefore calculated in the evaluation unit 36 by a combination of the evaluation of the first measuring signal and the evaluation of the second measuring signal. It is possible to calculate from the second measuring signal the general position and spatial orientation of the measurement object relative to the first sensor 30, and the surface geometry thereof, i.e. the relative position coordinates that the points which have been individually probed on the surface of the measurement object 14 have relative to one another, is then obtained from the first measuring signal.

To perform a measurement operation, the test plan within which the individual planned measurement points to be measured are specified in advance, is preferably transformed into a workpiece coordinate system, the origin of which is moved jointly with the object 14 to be measured during the measurement. Position and spatial orientation of this workpiece coordinate system are determined using the second optical sensor 32. The coordinates of the individual measurement points on the surface of the object 14 to be measured, in contrast, are measured by the first sensor 30 in said workpiece coordinate system. Without the second sensor 32, the position and spatial orientation of the workpiece coordinate system would not be known. However, due to the combination of both sensors 30, 32, both the coordinates of the individual measurement points on the surface of the object 14 to be measured in the workpiece coordinate system and also the position and spatial orientation of the workpiece coordinate system itself are known or can be determined within the evaluation unit 36. It is also possible hereby to determine the absolute coordinates of each individual measurement point on the surface of the object 14 to be measured.

The prerequisite for this type of measurement is, as already mentioned, that the two sensors 30, 32 in the measuring system 10 are connected rigidly to one another such that any displacements of the object 14 to be measured relative to the sensor unit affect them simultaneously. In addition, the integrated structure should be such that it is time- and temperature-stable. This can be effected by selecting suitable materials that are used to realize the rigid connection of both sensors 30, 32. These materials should preferably have low coefficients of thermal expansion, which are preferably less than 10-5 K-1 or less than 10-6 K-1, with particular preference even less than 10-8 K-1. These values can be achieved in the upper region of certain metal alloys (e.g. Dispal® and Invar®). The medium and low values are achieved when using e.g. technical ceramics such as Zerodur® and cordierite.

Alternatively or additionally, thermal drifts can be taken into consideration structurally in particular for using more cost-effective materials. Lengths and fixed points in the construction are designed here such that the thermal expansions of the construction materials used no longer transform to a thermal drift of the tool centre point of the first and second sensors 30, 32 (a thermal system design). For reasons of costs, generally a combination of said options will be used to rigidly connect the two sensors 30, 32 to one another.

The measuring head 24 which is designed as described above and is displaceable relative to the object 14 to be measured has a reference in the object space. This reference, which is realized using a multiplicity of optical markers 40, must, during the displacement of the measurement object 14, be fixedly connected thereto. This is realized either by way of a fastening device 42, as described above, or by way of one or more optical markers 40 being arranged directly on the object 14 to be measured.

For realizing the optical markers 40, a multiplicity of different variants are possible, which are designed for imaging methods. Ideally, the optical markers and the image processing implemented in the evaluation unit 36 should be effected such that, for a stable measurement operation, no continuous capturing of all optical markers 40 is necessary. This can be ensured by a specific configuration of the optical markers 40 themselves, or by their distributed arrangement at the object carrier 12 and/or object 14. Such a design permits not only the maximization of the measurement volume of the measuring system 10, because there is no need to permanently take into account that the object 14 to be measured in specific displacement positions could result in shadowing of the optical markers. Moreover, the operator of the measuring system 10, as is generally frequently necessary, can reach into the measurement volume "without concern", without negatively affecting the stable operation of the measuring system 10.

In dependence on the image-processing method used for determining the position and spatial orientation of the measurement object 14 relative to the first sensor 30, the reference in the object space can be one-dimensional, two-dimensional, three-dimensional or n-dimensional. The optical markers 40 in a preferred configuration variant contain a hologram exhibiting colour-dependent and/or time-dependent and/or polarization-dependent properties, with respect to which the second sensor 32 measures the spatial displacement and/or displacement velocity and/or displacement acceleration. The second sensor 32 is additionally designed in accordance with the dimensionality of the optical marker 40, e.g. in a spatially, depth-, colour-, time- and/or polarization-resolving manner.

However, for the objective that is actually intended with the present disclosure of a cost-effective configuration of such a measuring system 10, optical markers 40 which are designed as cost-effectively as possible are preferably used. Examples hereof are markers that are fixedly incorporated in the object carrier 12 using surface-modifying methods, e.g. by laser marking, milling or structured etching. A more cost-intensive configuration, which would, however, satisfy the most stringent of accuracy requirements, would be optical markers 40 that have lithographically structured quartz plates or strips. Likewise suitable for this objective would also be prints on low-elongation materials.

Brief reference will be made below to the calibration of the two sensors 30, 32, which is typically done at the factory, in order to match the two sensors 30, 32 to one another in accordance with the previously mentioned measurement method. To this end, for example a reference plate which is marked with high accuracy can be used. In more general words: a calibrated, possibly multi-sensor-capable reference object is arranged in the object space for calibration. This calibrated reference object is measured by the measuring system 10 in an automated pass that possibly contains a plurality of repetition loops. In the process, the changes in position and spatial orientation of the reference object that have been determined using the second sensor 32 on the basis of the optical markers 14 in the object space are continuously compared to the values that the first sensor 30 determines on the calibrated reference object. In this way, the first sensor 30 and the second sensor 32 are simultaneously calibrated with respect to their reference relative to one another and with respect to their graduation errors. If the optical markers 40 in the object space have a sufficiently time- and temperature-invariant design, a recalibration of the sensors 30, 32 can be effected later at any time during the measurement operation.

It is to be understood that the above-mentioned measurement principle is not limited to the previously mentioned concrete configuration of the first sensor 30 as a tactile sensor. According to the same principle, the first sensor 30 can also be configured in the form of an optical sensor or as a combined optical and tactile sensor. This has no bearing on the previously mentioned functional separation into measuring sensor 30 and the displacement sensor 32.

Figure 2:
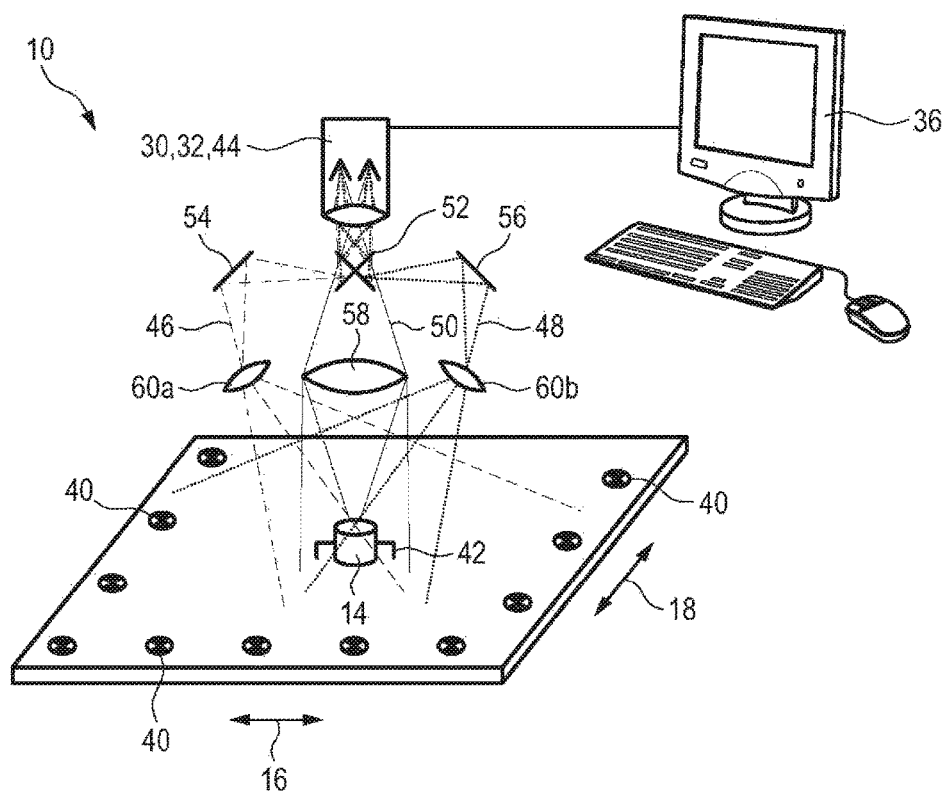
FIG. 2 shows a schematic view of a second exemplary embodiment of the measuring system.

Maximum integration of the principle according to the disclosure would be achieved by a configuration that is shown by way of example in FIG. 2. In this second exemplary embodiment, the two previously mentioned sensors 30, 32 are integrated in the same camera 44. For simplified illustration of the measurement principle used therein, parts of the measuring system 10, such as the base plate 20 and the illumination device 22, have been omitted in FIG. 2. However, these components, and also the remaining components of the measuring system 10, can be configured the same as described previously.

Both sensors 30, 32 are thus configured in the exemplary embodiment shown in FIG. 2 as optical sensors. The camera 44 in the example shown is in the form of an RGB camera for spectrally separating three sensor beam paths 46, 48, 50. The two sensor beam paths 46, 48, through which for example blue and red light travels, are used by the second sensor 32, and the third sensor beam path 50, through which for example green light travels, is used by the first sensor 30. To this end, the camera 44 has a spectral splitter 52 and two deflection mirrors 54, 56. In this way, the two sensors 30, 32 can be realized in the same camera 44.

The first sensor 30 uses a first lens 58. The second sensor 32 uses two second lenses 60a, 60b. The beam path 50 travels through the first lens 58. The beam paths 46, 48 travel through the respective second lenses 60a and 60b. It is to be understood that rather than providing two beam paths 46, 48 for the second sensor 32, only a single beam path with only one lens can be provided, as for the first sensor 30. In principle it is likewise also possible to use, instead of chromatic separation of the beam paths, a temporal or polarization-optical separation within the camera 44. Two measuring signals, i.e. the function of both sensors 30, 32, could also be realized in this way.

Choosing the technological principle used inside the camera 44 (chromatic, temporal or polarization-optical separation of the two signals) is typically dependent on the optimization target. Highest resolutions are achieved if all camera pixels can be used both for measuring the object contour (first measuring signal) and for measuring the object displacement (second measuring signal), which would require a temporal separation of both signals. Lower resolutions when using the same camera chip, but higher speeds would be achieved for example using chromatic separation, as is shown by way of example in FIG. 2, because in that case the object geometry and the object pose can be measured simultaneously. This simultaneous measurement strategy is preferred for achieving highest accuracies, because the time offsets and the instabilities thereof can then have no influence on the determination of the spatial relationships of the image contents even for the always inevitable residual movement of the measuring system 10 during measurement.

The focal planes of the two beam paths 46, 48 used for the second sensor 32 are preferably inclined, with the result that their focal planes are no longer strictly parallel with respect to the object carrier plane. Owing to their great depth of field, however, all regions of the object carrier plane are imaged with sufficient sharpness. The optical axes of the second lenses 60a, 60b are therefore preferably inclined with respect to the optical axis of the first lens 58. The two beam paths 46, 48 used for the second sensor 32 do not necessarily need to have a common field of view. Advantageously, the overlap region can even be small or zero. This is because this permits the introduction of a large stereo base using identifiable optical markers 40 for the displacement determination within the second sensor. If the overlap is zero, algorithmic/image-processing methods for determining the marker position should be used, which do not, strictly speaking, represent classical stereoscopy. Nevertheless, even in this method the larger camera distance has an effect that is analogous to increasing what is known as the stereo base in stereoscopy. Using a sensor system that is designed in this manner, all displacement degrees of freedom (translation and rotation) of the object 14 to be measured relative to the sensor system and the object contours can be measured using a single camera. If necessary, the stereo optical unit can also be used to support 3D contour measurements.

The optical units of the two sensors 30, 32 have a different configuration within the camera 44 owing to the different requirement profile of the two sensors 30, 32. The first lens 58 of the first sensor 30 preferably has a lower depth of field as compared to the second lenses 60a, 60b of the second sensor 32, but a greater focal length and a smaller field angle. The first lens 58 is advantageously telecentric, the two other lenses 60a, 60b are not. This design suppresses the influence of focus plane deviations on the dimensional measurement of the object 14 and already allows a determination of the object displacement relative to the sensor system in the z-direction by evaluating the size of or the distance between the optical markers 40.

In this second exemplary embodiment, the optical markers 40 should also be connected to one another via a time- and temperature-invariant connection and they should be determined most accurately in terms of their relative orientation with respect to one another as part of the factory calibration of the measuring system 10 by comparison with a reference object and be stored within the controller 36 for later access by image processing.

The second sensor 32 can also be used as an overview optical unit to facilitate the navigation within the object 14 to be measured for the user. This can be advantageous in particular for highly magnifying measurement optical units with correspondingly small fields of view.

For illuminating the object space, both brightfield illumination and dark-field illumination can be used in both exemplary embodiment shown in the figures. These can make use in the exemplary embodiment shown in FIG. 2 of the available beam paths 46, 48, 50, i.e. be superimposed thereon in a suitable fashion.

In summary, it can thus be stated that the concept according to the disclosure completely eliminates the necessity of precision mechanical engineering, while offering enormous potential for cost savings and still meeting the desired requirements with respect to high measurement accuracy. Using the second sensor 32, direct localization of the tool centre point in the workpiece coordinate system is effected. The mechanical connections between the object carrier and the measuring sensor system for this reason do not need to be realized with high precision, because, unlike in conventional coordinate measuring machines, no mechanical connection of tool centre point and workpiece to material measures by indirect methods takes place. The standard connection is shifted in a cost-effective manner into the time-invariant pixel grid, i.e. the imaging scale of the camera used. For the case that temperature variations result in variations of this standard connection that limit accuracies, the second sensor 32, i.e. its reference points in the object space, can be alternatively or additionally be configured in the simplest manner such that the influence of said temperature variations can be captured. As a result, the standard connection would then be compensated for all application-technologically relevant temperature intervals and changes.

The measurement principle introduced here is not limited to any specific construction of the coordinate-measuring machine. Instead of the stand-type setup shown in FIG. 1, other setups can also be used, for example portal design, bridge design, cantilever design or post design. The measurement principle described or the technology described can of course also be used to construct measuring appliances using hand-guided measuring sensor systems.

What is claimed is:

1. Measuring system for dimensionally measuring an object, comprising:
    an object carrier for receiving the object to be measured;
    a plurality of optical markers, which are arranged at the object carrier and/or the object to be measured;
    a first sensor for a tactile, optical and/or tomographic scanning of the object to be measured, wherein the first sensor generates a first measuring signal;
    a second, optical sensor arranged for capturing a spatial orientation and position of the object to be measured with the help of the optical markers, wherein the second sensor generates a second measuring signal that contains information relating to position and spatial orientation of the optical markers, and wherein the second sensor is connected to the first sensor via a mechanically rigid connection; and
    an evaluation unit that is configured to determine, from the second measuring signal, the position and spatial orientation of the object to be measured relative to the first sensor and to determine, from the first measuring signal, a geometry of the object to be measured.

2. Measuring system according to claim 1, wherein the evaluation unit is configured to determine, from the second measuring signal, a position and spatial orientation of a workpiece coordinate system that moves jointly with the object to be measured, and wherein the evaluation unit is configured to determine, from the first measuring signal, coordinates of individual measurement points within the workpiece coordinate system, which measurement points are scanned in tactile, optical and/or tomographic fashion by the first sensor to determine the geometry of the object to be measured.

3. Measuring system according to claim 1, wherein the first sensor and the second sensor are arranged in neighboring fashion with respect to one another in a structurally shared sensor unit.

4. Measuring system according to claim 1, wherein the measuring system further comprises a movement mechanism for moving the object carrier along at least one axis manually or by way of a motor.

5. Measuring system according to claim 1, wherein the optical markers are arranged at the object carrier, and wherein the object carrier comprises a fastening device for fastening the object to be measured to the object carrier.

6. Measuring system according to claim 1, wherein the first sensor is a tactile sensor which comprises a tactile probe head for probing the object to be measured in tactile fashion.

7. Measuring system according to claim 6, wherein the evaluation unit is configured to determine the position and spatial orientation of the tactile probe head from the second measuring signal when the object to be measured is contacted by the tactile probe head.

8. Measuring system according to claim 1, wherein the first sensor is an optical sensor.

9. Measuring system according to claim 8, wherein the first optical sensor comprises a first lens and the second optical sensor comprises a second lens, wherein the first lens has a lower depth of field, a larger focal length and/or a lower field angle than the second lens.

10. Measuring system according to claim 9, wherein the first lens has a first optical axis and the second lens has a second optical axis, wherein the second optical axis is inclined relative to the first optical axis.

11. Measuring system according to claim 8, wherein the first optical sensor comprises a telecentric lens and wherein the second optical sensor comprises a non-telecentric lens.

12. Measuring system according to claim 8, wherein the first sensor and the second sensor are integrated in one and the same camera, which has two beam paths that are separated from one another chromatically and/or temporally and/or in polarization-optical terms, wherein a first beam path of the two beam paths is used by the first sensor and a second beam path of the two beam paths is used by the second sensor.

13. Measuring system according to claim 12, wherein the first and second sensors use one and the same camera chip of the camera.

14. Measuring system according to claim 12, wherein the camera has a third beam path, which is separated from the first beam path chromatically and/or temporally and/or in polarization-optical terms and is used by the second sensor.

15. Measuring system according to claim 13, wherein the first and second sensors use one and the same camera chip of the camera.

16. Measuring system according to claim 1, wherein the optical markers comprise at least one colour-dependent, time-dependent and/or polarization-dependent hologram.

* * * * *